(12) United States Patent
Kato et al.

(10) Patent No.: US 6,175,990 B1
(45) Date of Patent: Jan. 23, 2001

(54) HINGE DEVICE

(75) Inventors: Hideo Kato; Oriya Fujita, both of Kanagawa (JP)

(73) Assignee: Katoh Electrical Machinery Co., Ltd., Kanagawa (JP)

(*) Notice: Under 35 U.S.C. 154(b), the term of this patent shall be extended for 0 days.

(21) Appl. No.: 09/166,407

(22) Filed: Oct. 5, 1998

(30) Foreign Application Priority Data

Oct. 8, 1997 (JP) .................................................. 9-276311
Oct. 8, 1997 (JP) .................................................. 9-276312

(51) Int. Cl.$^7$ .................................................. E05C 17/64
(52) U.S. Cl. .............................. 16/334; 16/303; 16/341; 379/433
(58) Field of Search ............................ 16/303, 341, 334; 379/433

(56) References Cited

U.S. PATENT DOCUMENTS

| 571,133 | * | 11/1896 | Hoffman | 16/303 |
| 5,165,145 | * | 11/1992 | Sherman | 16/341 |
| 5,724,683 | * | 3/1998 | Sorimachi et al. | 16/303 |
| 5,848,152 | * | 12/1998 | Slipy et al. | 379/433 |
| 5,923,751 | * | 7/1999 | Ohtsuka et al. | 379/433 |

FOREIGN PATENT DOCUMENTS

626031 * 10/1961 (IT) .................................................. 16/303

* cited by examiner

Primary Examiner—Anthony Knight
Assistant Examiner—Mark Williams
(74) Attorney, Agent, or Firm—Notaro & Michalos P.C.

(57) ABSTRACT

In order to fabricate a hinge device for opening and closing an opening and closing member which is opened and closed one-sidedly or relatively in respect of a main body of the device in a small size, with a structure as simple as possible and inexpensively, the device is constituted by a shaft installed with a flange portion at one end portion thereof, a fixing member having a rotational lock which is engaged with other end portion of the shaft such that the fixing member does not come of f the other end portion and fixed to one connecting portion of the opening and closing member which is constituted to be rotatable along with the shaft, a fixed cam having a rotational lock which is fixed to other connecting portion of the opening and closing member while rotatably inserting the rotating shaft through a central portion thereof on a side of the flange portion of the rotating shaft, a rotary sliding cam which is installed between the fixed cam and the fixing member, engaged with the shaft inserted through a central portion thereof, is rotatable along with the shaft and slidable in the axial direction and a compression spring elastically installed between the rotary sliding cam and the fixing member by being wound around the shaft in which the fixed cam is installed with a pair of cam portions at opposed positions at one side face thereof and the rotary sliding cam is installed with projected portions which are brought into press contact with the cam portions of the fixed cam.

3 Claims, 15 Drawing Sheets

HINGE DEVICE

FIELD AND BACKGROUND OF THE INVENTION

1. Field of the Invention

The present invention relates to a hinge device preferably used in opening and closing various opening and closing members of a small-sized electronic device such as a portable telephone, a portable computer, an electronic notebook or the like relative to a main body of the device.

2. Description of Related Art

Conventionally, this kind of a hinge device is referred to as a tilt hinge and there have been publicly known various constitutions in which various cams and springs are integrated to maintain an opening and closing member at an arbitrary or a predetermined opening angle relative to a main body of a device. However, there poses a problem in any of them that the structure is excessively complicated and fabrication cost is high. In recent years, industrial circles are exposed to rough waves of reduction in cost and also in this kind of technical field of electronic devices, request for small size formation and reduction in cost is very severe.

SUMMARY OF THE INVENTION

It is an object of the present invention to provide a hinge device capable of meeting technological request required in a hinge device mentioned above and capable of fabricating in a small size, with a simple structure and inexpensively.

In order to achieve the above-described object, according to one aspect of the present invention, there is provided a hinge device for opening and closing an opening and closing member which is opened or closed one-sidedly or relatively in respect of a main body of the device, the hinge device comprising a shaft installed with a flange portion at one end portion thereof, a fixing member having a rotational lock which is locked to other end portion of the shaft and fixed to one connecting portion of the opening and closing member constituted to be rotatable along with the shaft, a fixed cam having a rotational lock which is engaged with a side of the flange portion of the rotating shaft by rotatably inserting the rotating shaft through a central portion thereof and is fixed to other connecting portion of the opening and closing member, a rotary sliding cam which is installed between the fixed cam and the fixing member, engaged with the shaft inserted through a central portion thereof and is rotatable along with the shaft and slidable in an axial direction, and a compression spring elastically installed between the rotary sliding cam and the fixing member by being wound around the shaft, wherein the fixed cam is installed with a pair of cam portions at opposed positions on one side face thereof and the rotary sliding cam is installed with projected portions which are brought into press contact with the cam portions of the fixed cam.

According to another aspect of the present invention, there is provided a hinge device for opening and closing an opening and closing member which is opened and closed one-sidedly or relatively in respect of a main body of the device, the hinge device comprising a shaft made of a synthetic resin which is respectively installed with a flange portion at one end portion thereof, a deformed shaft portion at a central portion thereof and an engaging groove for attaching a lock ring and a peripheral groove for attaching an E ring at other end portion thereof, a fixing member made of a synthetic resin having a rotational lock which is engaged with an end portion of the deformed shaft portion of the shaft by lockingly mounting a lock ring engaged with the end portion at inside thereof, and fixed to one connecting portion of the opening and closing member constituted to be rotatable along with the rotating shaft, a fixed cam having a rotational lock which is engaged with a side of the flange portion of the rotating shaft by rotatably inserting the rotating shaft through a central portion thereof and is fixed to other connecting portion of the opening and closing member, a rotary sliding cam made of a synthetic resin which is opposed to the fixed cam, engaged with the deformed shaft portion of the shaft and attached slidably in an axial direction, and a compression spring elastically installed between the rotary sliding cam and the fixing member by being wound around the shaft, wherein the fixed cam is installed with cam portions at one side face thereof and the rotary sliding cam is installed with a plurality of projected portions which are brought into press contact with the cam portions.

According to another aspect of the present invention, there is provided a hinge device for connecting a transmitting unit and a receiving unit of a portable telephone to each other, the hinge device comprising a shaft one end portion of which is engaged with a fixing member having a rotational lock which is fixedly contained in a containing hole installed in an axial direction of a connecting portion installed at an end portion of either of the transmitting unit and the receiving unit, a fixed cam having a rotational lock which is rotatably inserted with the shaft at an insertion hole installed in the axial direction of a central portion thereof at the one end portion of the shaft, locked by a flange portion of the shaft and fixedly contained in a containing hole installed in the axial direction of a connecting portion of either of the transmitting unit and the receiving unit to which the fixing member is not fixed, a rotary sliding cam which is installed between the fixed cam and the fixing member, engaged with the shaft inserted through a central portion thereof, is rotatable along with the shaft and slidable in the axial direction, and a compression spring elastically installed between the rotary sliding cam and the fixing member by being wound around the shaft, wherein the fixed cam is installed with cam portions at one side face thereof and the rotary sliding cam is installed with projected portions which are brought into press contact with the cam portions.

According to another aspect of the present invention, there is provided a hinge device for opening and closing an opening and closing member which is opened and closed one-sidedly or relatively in respect of a main body of the device, the hinge device comprising a shaft leftwardly and rightwardly engaged with connecting portions of an opening and closing member, a fixing member having a rotational lock which is engaged with one end portion of the shaft and fixed to one of the connecting portions of the opening and closing member which is constituted to be rotatable along with the shaft, a fixed cam having a rotational lock which is engaged with other of the connecting portions of the opening and closing member by rotatably inserting the rotating shaft into a central portion thereof, a rotary sliding cam which is installed between the fixed cam and the fixing member, engaged with the shaft inserted through a central portion thereof, rotatable along with the shaft and slidable in the axial direction, and a compression spring which is elastically installed between the rotary sliding cam and the fixing member by being wound around the shaft, wherein the fixed cam is installed with a pair of cam portions at opposed positions on one side face thereof, the rotary sliding cam is installed with projected portions which are brought into press contact with the cam portions and the shaft is fixed to one side of the opening and closing member by fixing means such that the shaft is prevented from coming off the opening and closing member.

According to another aspect of the present invention, there is provided a hinge device for opening and closing an opening and closing member which is opened or closed one-sidedly or relatively in respect of a main body of the device, the hinge device comprising a shaft having a deformed shaft portion on a side of one side portion of a central portion and a large diameter circular shaft portion on a side of other side portion, installed with an engaging groove for attaching a lock ring at one end portion of the deformed shaft portion and attached with a fixing screw at an end portion of the circular shaft portion, a fixing member having a rotational lock which is engaged with the shaft by fixedly containing a lock ring locked to the end portion of the deformed shaft portion of the shaft at an inner portion thereof and is rotatable along with the rotating shaft, a fixed cam having a rotational lock which is engaged with other connecting portion of the opening and closing member by rotatably inserting the rotating shaft at a central portion thereof on a side of the deformed shaft portion of the rotating shaft via a friction plate on a side of a flange portion, a rotary sliding cam which is opposed to the fixed cam, engaged with the deformed shaft portion of the shaft and attached slidably in an axial direction, and a compression spring elastically installed between the rotary sliding cam and the fixing member by being wound around the shaft, wherein a protection cylinder is fitted to outer peripheries of the rotary sliding cam and the compression spring, the fixed cam is installed with cam portions at one side face thereof, the rotary sliding cam is installed with a plurality of projected portions which are brought into press contact with the cam portions and the shaft is fixed to one side of the opening and closing member by the fixing screw such that the shaft is prevented from coming off the opening and closing member.

According to another aspect of the present invention, there is provided a hinge device for connecting a transmitting unit and a receiving unit of a portable telephone to each other, the hinge device comprising a shaft one end portion of which is engaged with a fixing member having a rotational lock which is fixedly contained in a containing hole installed in an axial direction of a connecting portion provided at an end portion of either of the transmitting unit and the receiving unit, a fixed cam having a rotational lock which is rotatably inserted with the shaft at an insertion hole installed in the axial direction of a central portion thereof and is fixedly contained in a containing hole which is engaged with a central portion of the shaft and installed in the axial direction of a connecting portion on a side in which the fixing member of either of the transmitting unit and the receiving unit is not fixed, a rotary sliding cam installed between the fixed cam and the fixing member, engaged with the shaft inserted through a central portion thereof, is rotatable along with the shaft and slidable in the axial direction, and a compression spring elastically installed between the rotary sliding cam and the fixing member by being wound around the shaft, wherein the fixed cam is installed with cam portions at one side face thereof, the rotary sliding cam is installed with projected portions which are brought into press contact with the cam portions and the shaft is fixed to either of the transmitting unit and the receiving unit by a fixing screw such that the shaft is prevented from coming off either of the transmitting unit and the receiving unit.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
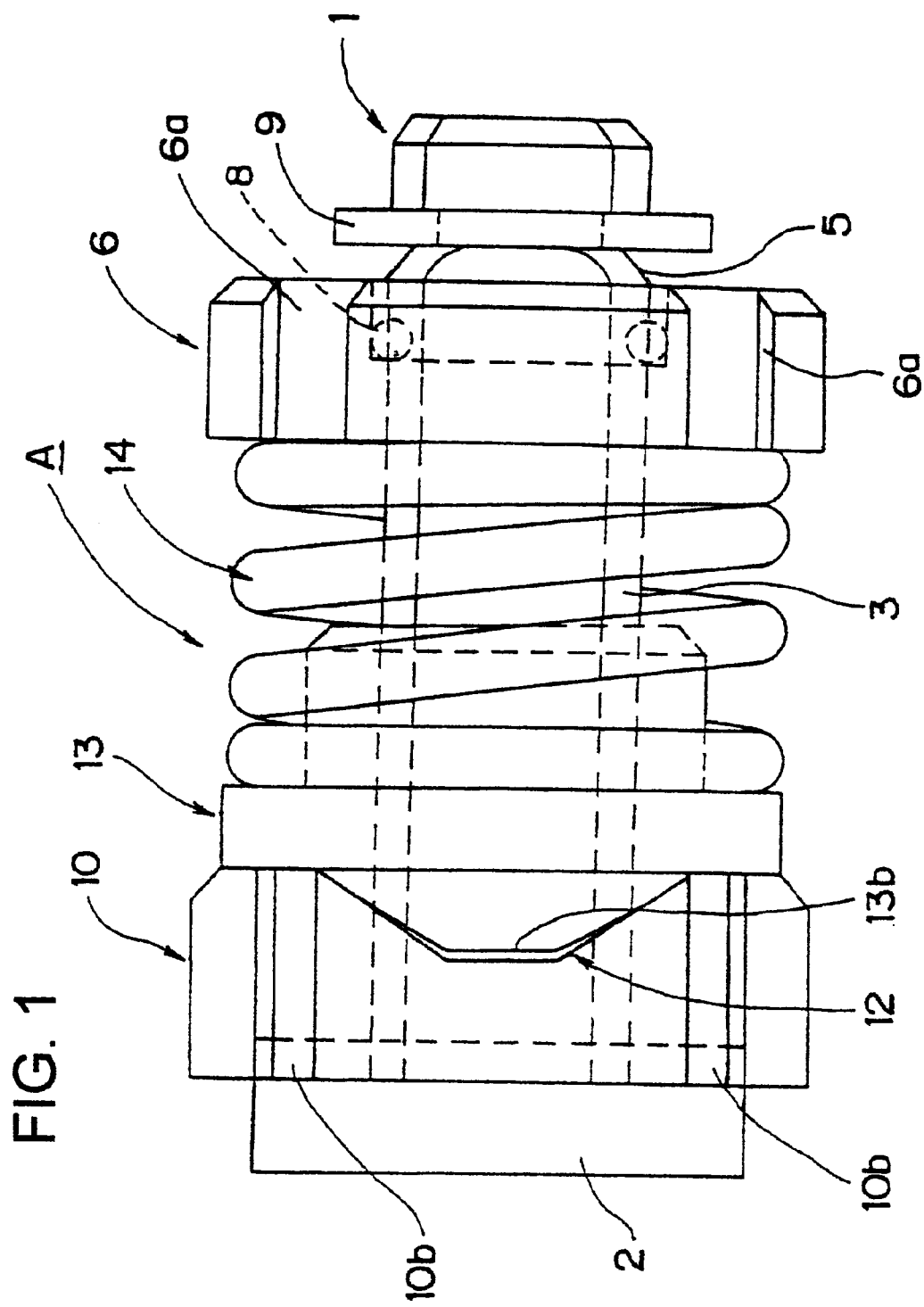
FIG. 1 is a front view of a hinge device according to the present invention.
Figure 2:
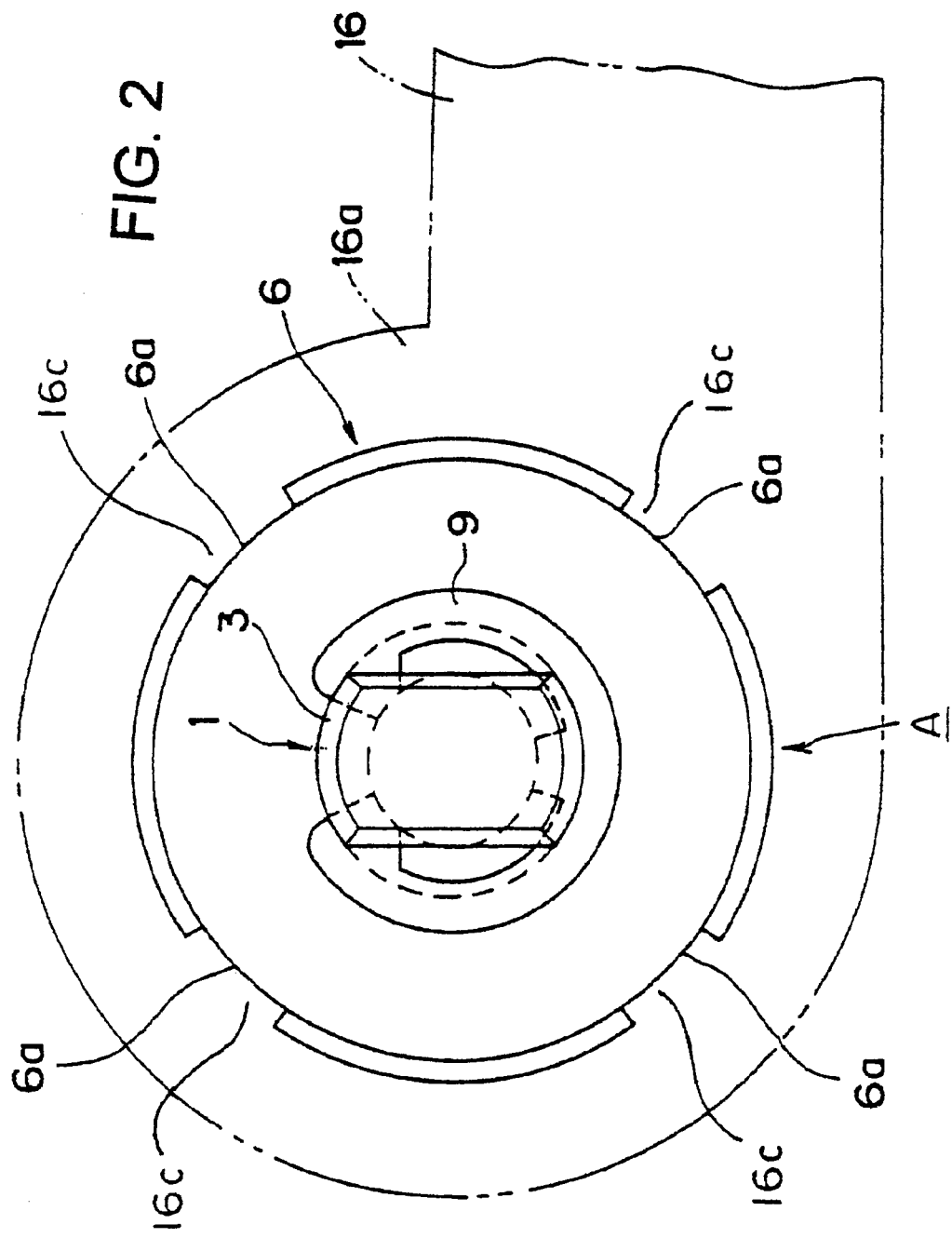
FIG. 2 is a right side view of the hinge device shown in FIG. 1.
Figure 3:
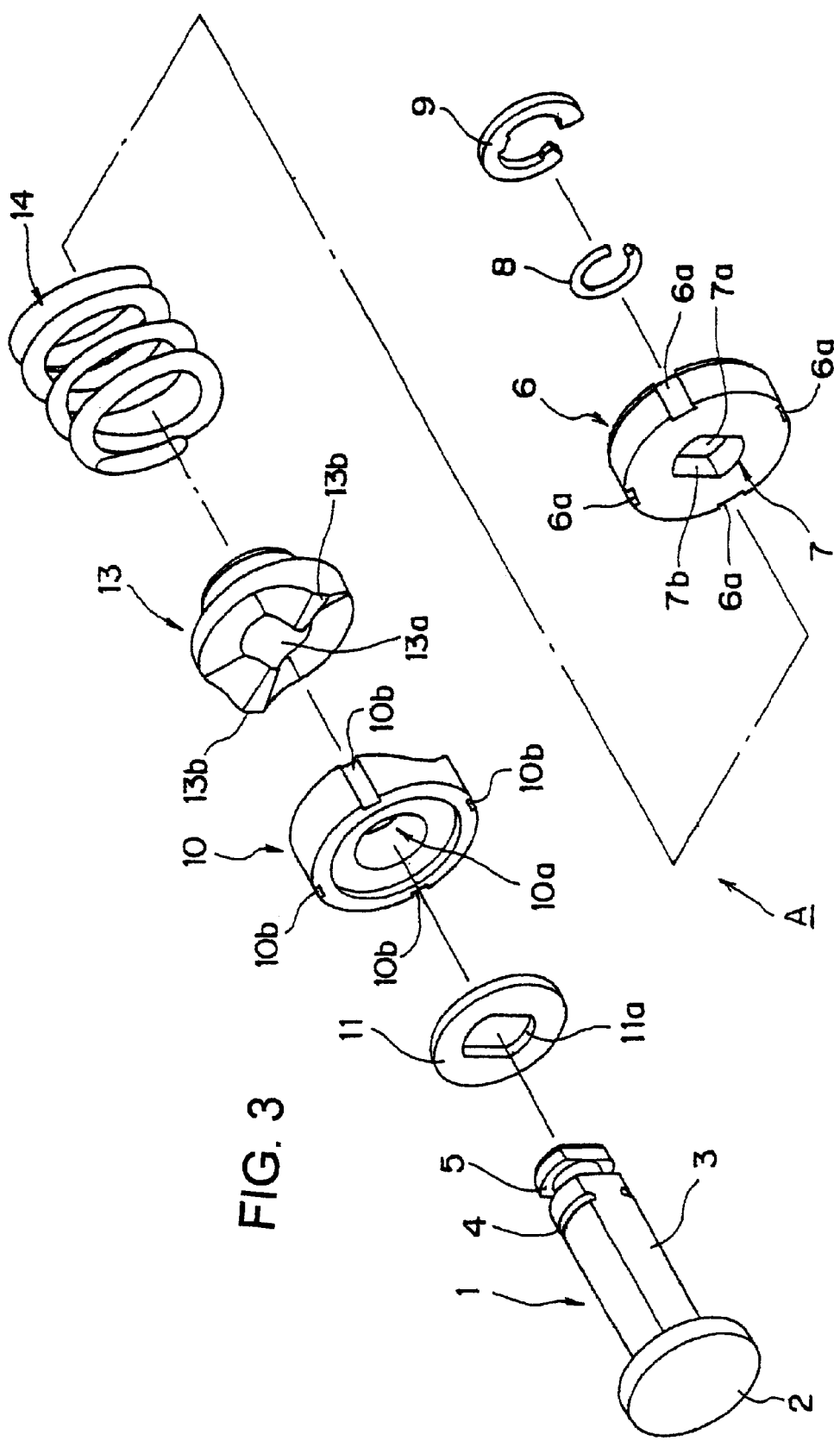
FIG. 3 is a disassembled perspective view of the hinge device shown in FIG. 1.

The drawings show an embodiment of the present invention, in FIG. 1 through FIG. 3, numeral 1 designates a shaft made of synthetic resin of POM or the like and the shaft 1 is constituted by a flange portion 2 provided at one end portion thereof, a deformed shaft portion 3 having a section substantially in an elliptical shape installed successive to the flange portion 2, an engaging groove 4 for attaching a lock ring and a peripheral groove 5 for an E ring. Numeral 6 designates a fixing member similarly made of synthetic resin of POM or the like. The fixing member 6 is provided with a stepped hole 7 comprising a circular hole 7a for attaching a lock ring and a deformed hole 7b in an elliptical shape at a central portion thereof in the axial direction and installed with a plurality of engaging grooves 6a for constituting a rotational lock means at its outer periphery, the deformed shaft portion 3 is inserted into and locked by the deformed hole 7b and an engaging ring 8 fitted to the engaging groove 4 is locked to the deformed hole 7b by being mounted into the circular hole 7a at inside of the stepped hole 7 by which the shaft 1 is fixed such that the shaft 1 does not come off the fixing member and the fixing member is rotated along with the shaft 1. Further, an E ring 9 is fitted to another one of the peripheral groove 5. On the side of the flange portion 2 of the shaft 1, a fixed cam 10 made of synthetic resin of, for example, SW-01 or the like is locked by the flange portion 2 by rotatably inserting the deformed shaft portion 3 of the shaft 1 into a circular hole 10a provided at its central portion and a friction plate 11 made of synthetic resin of, for example, nylon or the like is interposed between the flange portion 2 and the fixed cam 10 while inserting the deformed shaft portion 3 into a deformed hole 11a provided at its central portion. The fixed cam 10 is installed with a plurality of engaging grooves 10b constituting a rotational lock means at its outer periphery and installed with a cam portion 12 comprising pluralities of recessed portions 12a and projected portions 12b at one side face thereof. Further, the engaging groove 6a of the fixing member 6 and the engaging groove 10b of the fixed cam 10 are different from each other in respect of widths thereof and both a depth and a width of the engaging groove 6a of the fixing member 6 are deeper and wider. A rotary sliding cam 13 made of synthetic resin of, for example, 6302T or the like is attached to the shaft 1 slidably in the axial direction of the deformed shaft portion 3 and rotatably along with the shaft 1 between the fixed cam 10 and the fixing member 6 by inserting the deformed shaft portion 3 into a deformed insertion hole 13a provided at its central portion in the axial direction. A plurality of projected portion 13b are installed at a side face of the rotary sliding cam 13 opposed to the cam portion 12 of the fixed cam 10. Further, a compression spring 14 is elastically installed between the rotary sliding cam 13 and the fixing member 6 by being wound around the shaft 1 for always pressing the rotary sliding cam 13 to the side of the fixed cam 10 and the projected portions 13b are brought into press contact with the cam portion 12. Incidentally, the size of a total of the hinge is small-sized in which an outer diameter of a largest portion thereof is substantially 5 mm and a length of a total of the hinge is about 10 mm.

Figure 4:
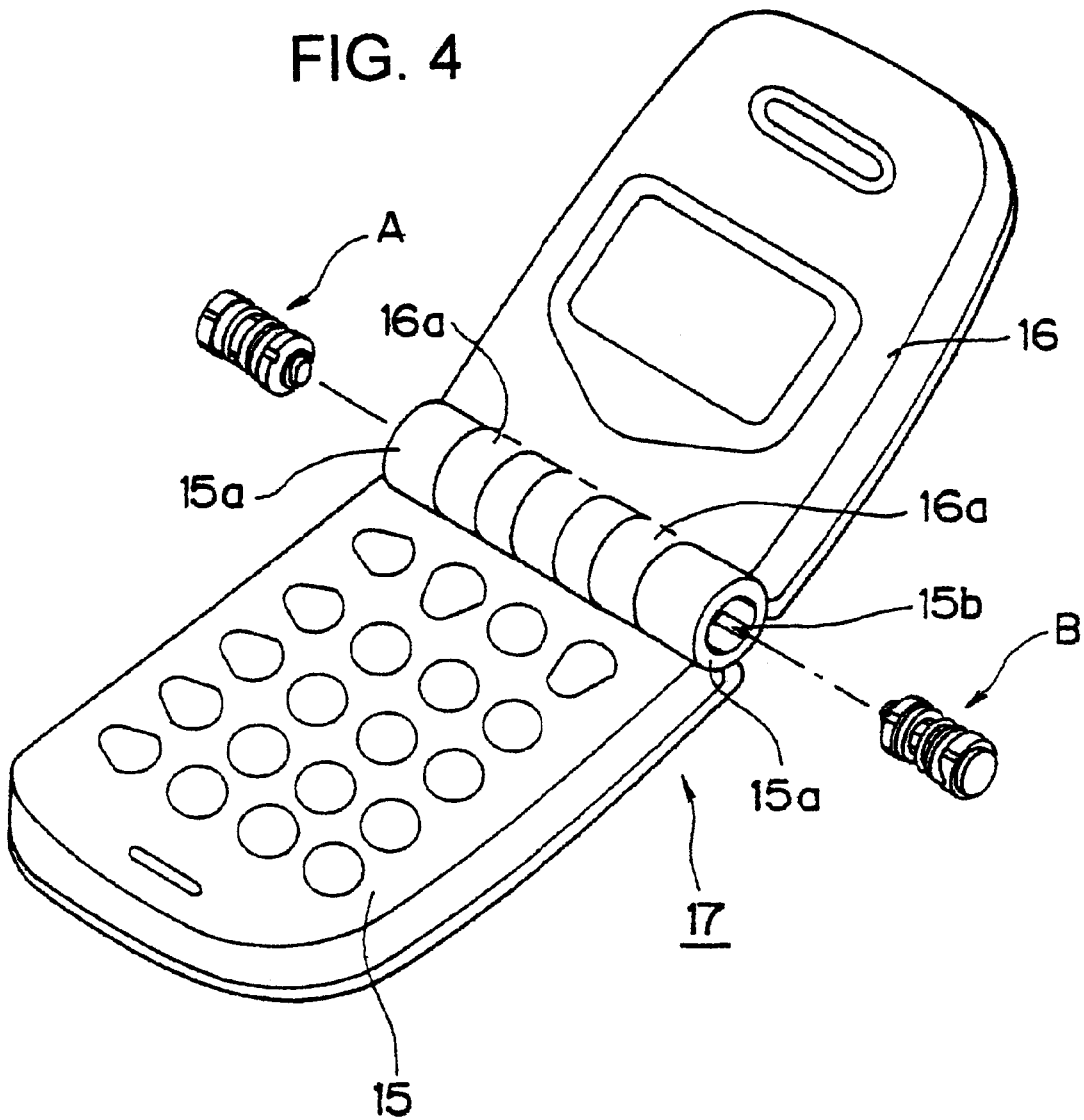
FIG. 4 is a partially disassembled perspective view of a portable telephone in which a hinge device according to the present invention is implemented.
Figure 5:
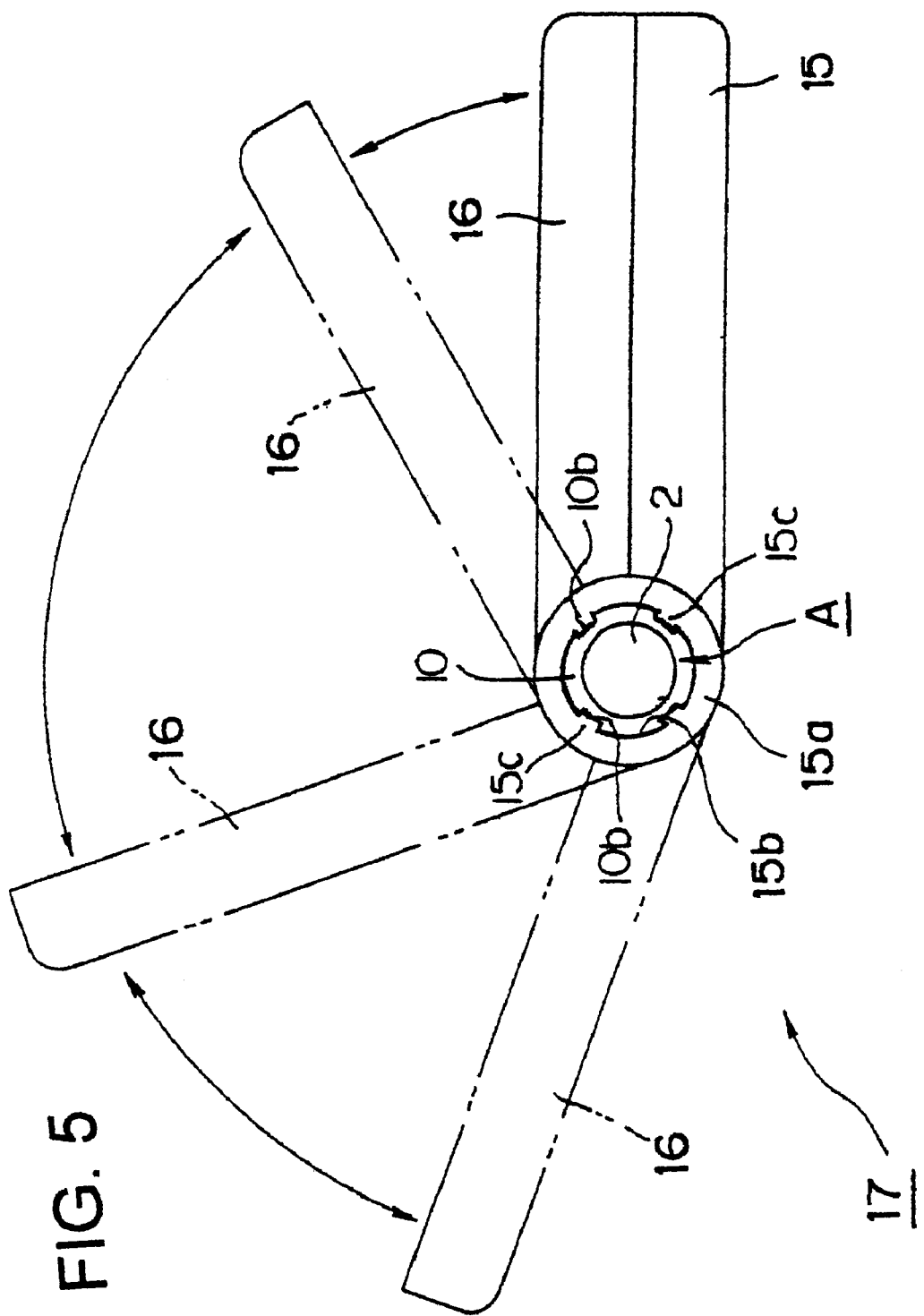
FIG. 5 is a side view of an opening state of the portable telephone shown in FIG. 4.
Figure 6:
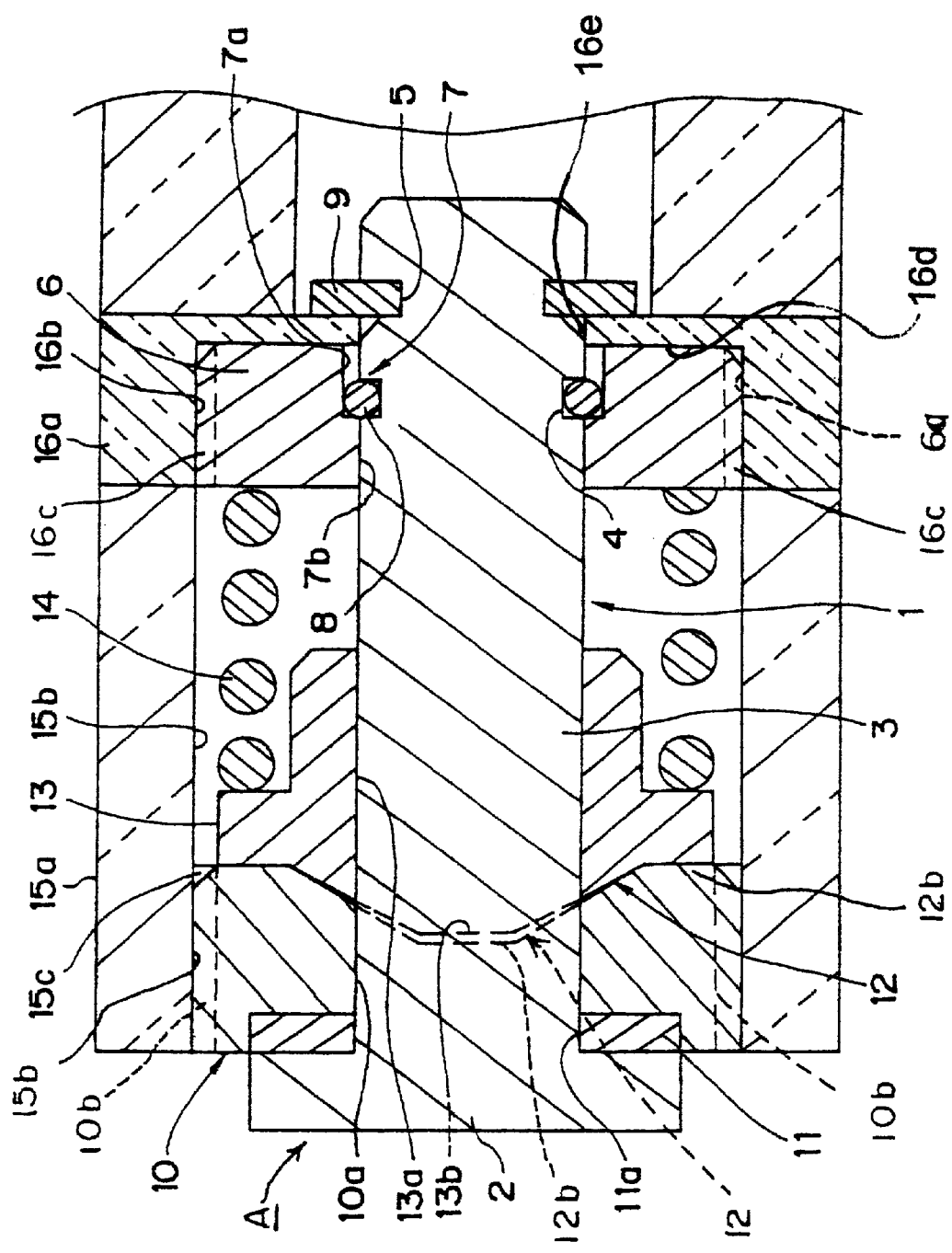
FIG. 6 is a sectional view enlarging a portion of a hinge device in the portable telephone device shown in FIG. 4.

FIG. 4 through FIG. 6 shows a case in which the hinge device according to the present invention is used in a portable telephone. As specifically shown in FIG. 4, a pair of left and right hinge devices A and B according to the present invention are used and are fixed to contain at insides of attaching holes 15b (only one of them is shown) and attaching hole 16b (only one of them is shown) installed to connecting portions 15a and 16a provided at respective end portions of a transmitting unit 15 and a receiving unit 16 of a portable telephone 17. For example, the hinge devices A and B are inserted from sides of the attaching hole 15b with the sides of the fixing members 6 as front sides and the engaging grooves 6a of the fixing members 6, for rotational lock, are engaged with engaging projections 16c installed to the attaching holes 16b, and thereby the fixing members 6 are fixed insides of the attaching holes 16b of the connecting portions 16a of the receiving unit 16, successively, the engaging grooves 10b of the fixed cam 10, for rotational lock, are inserted into the attaching holes 15b of the connecting portions 15a in the transmitting unit 15 and are fixedly engaged with engaging projections 15c provided there.

Next, the E rings 9 are fitted to the peripheral grooves 5 of the deformed shaft portions 3 of the shafts 1 projected from end portions of the connecting portion 16a and the hinge devices A and B are locked to the attaching portions 16 such that they do not come off. Further, when the transmitting unit 15 is opened and closed relative to the receiving unit 16 under the state, the shafts 1 are rotated along with the attaching portions 16a of the receiving unit 16 via the fixing members 6. Incidentally, opening and closing of the transmitting unit 15 and the receiving unit 16 are relative to each other and the transmitting unit 15 may be opened or closed relative to the receiving unit 16. In this case, the fixed cam 10 is rotated around the shaft 1 along with the connecting portion 16a to which it is fixedly engaged with. When the depth and the width of the engaging groove 6a of the fixing member 6 is made deeper and wider than those of the engaging groove 10b of the fixed cam 10, there is provided an advantage in which in inserting the hinge device from the attaching hole 16b with the side of the fixing member 6 as the front side, it is not caught by the engaging projection 16c.

Figure 7:
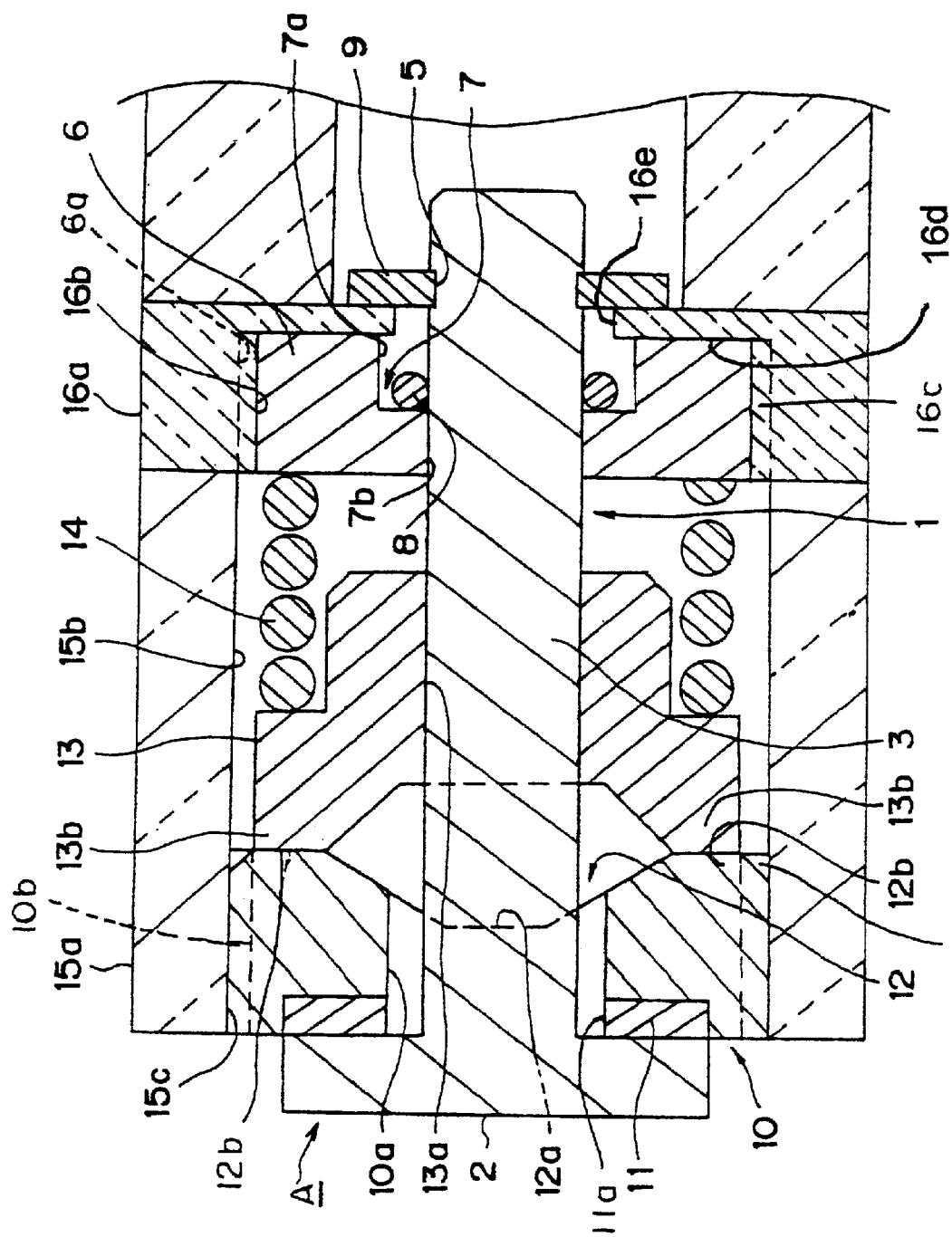
FIG. 7 is an enlarged sectional view in correspondence with the enlarged sectional view shown in FIG. 6 for explaining the operation.
Figure 8:
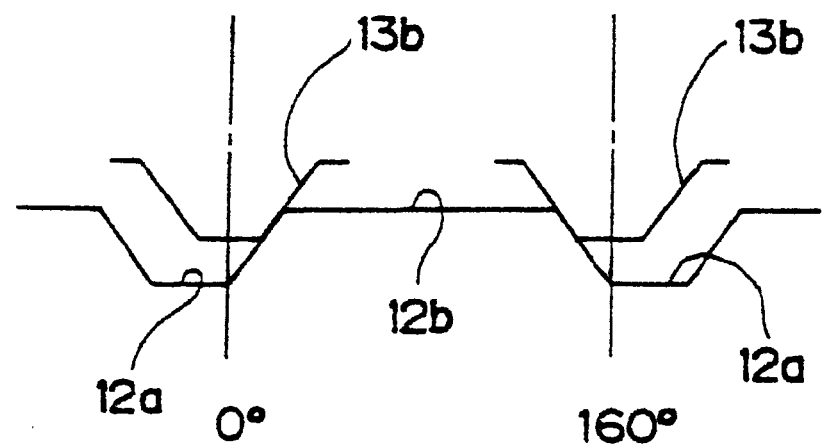
FIG. 8 is an explanatory view for explaining the operation of a fixed cam and a rotary sliding cam at 0 degrees.
Figure 9:
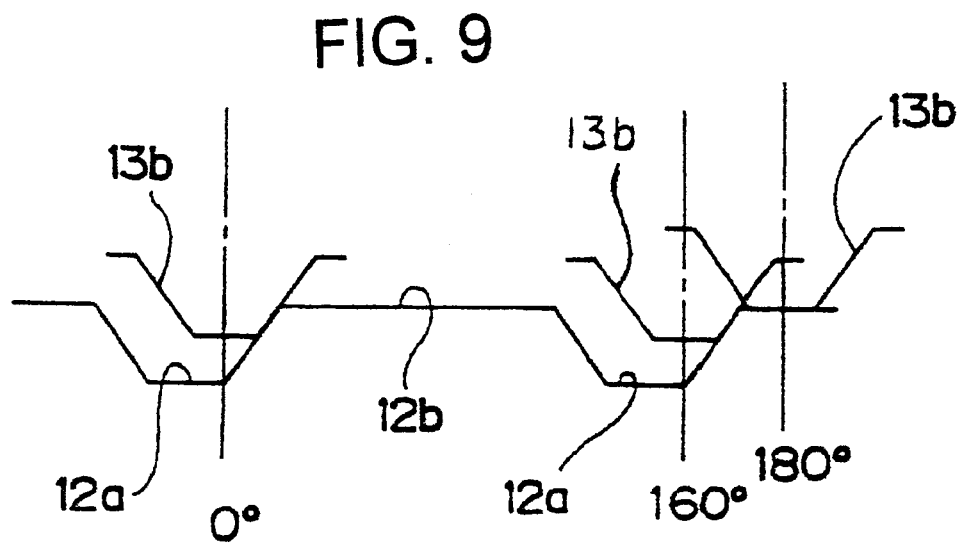
FIG. 9 is an explanatory view for explaining the operation of the fixed cam and the rotary cam at 160 degrees.
Figure 10:
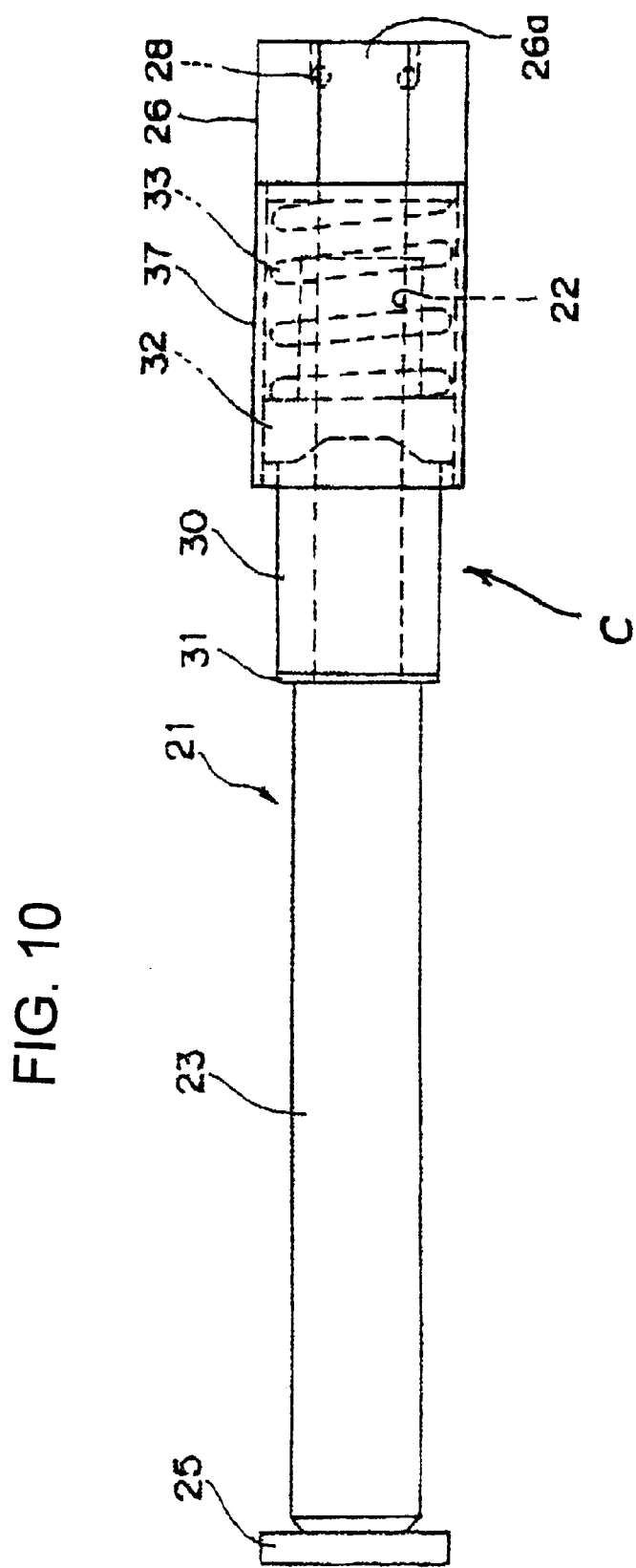
FIG. 10 is a front view showing other embodiment of a hinge device according to the present invention.
Figure 11:
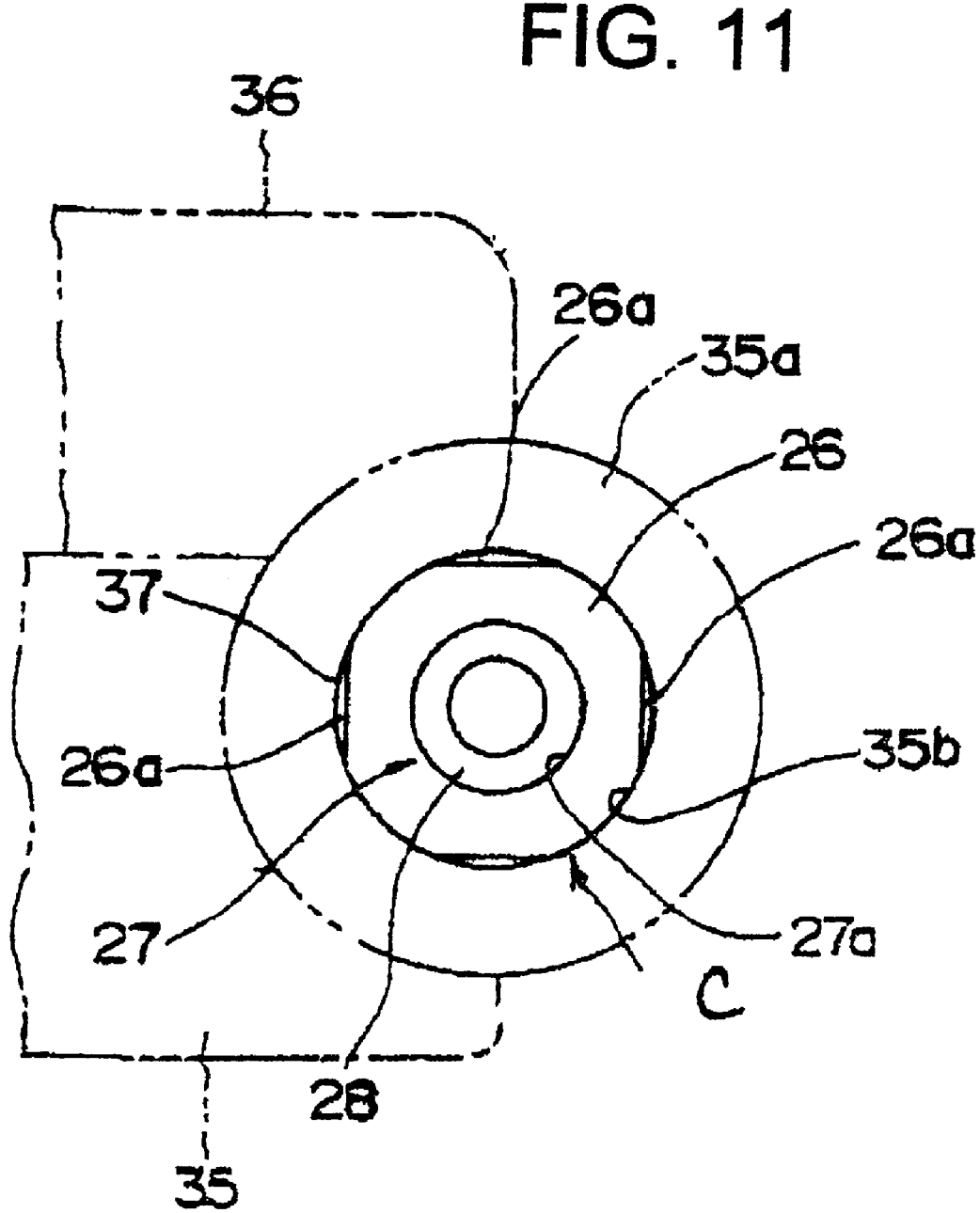
FIG. 11 is a right side view of the hinge device shown in FIG. 10.
Figure 12:
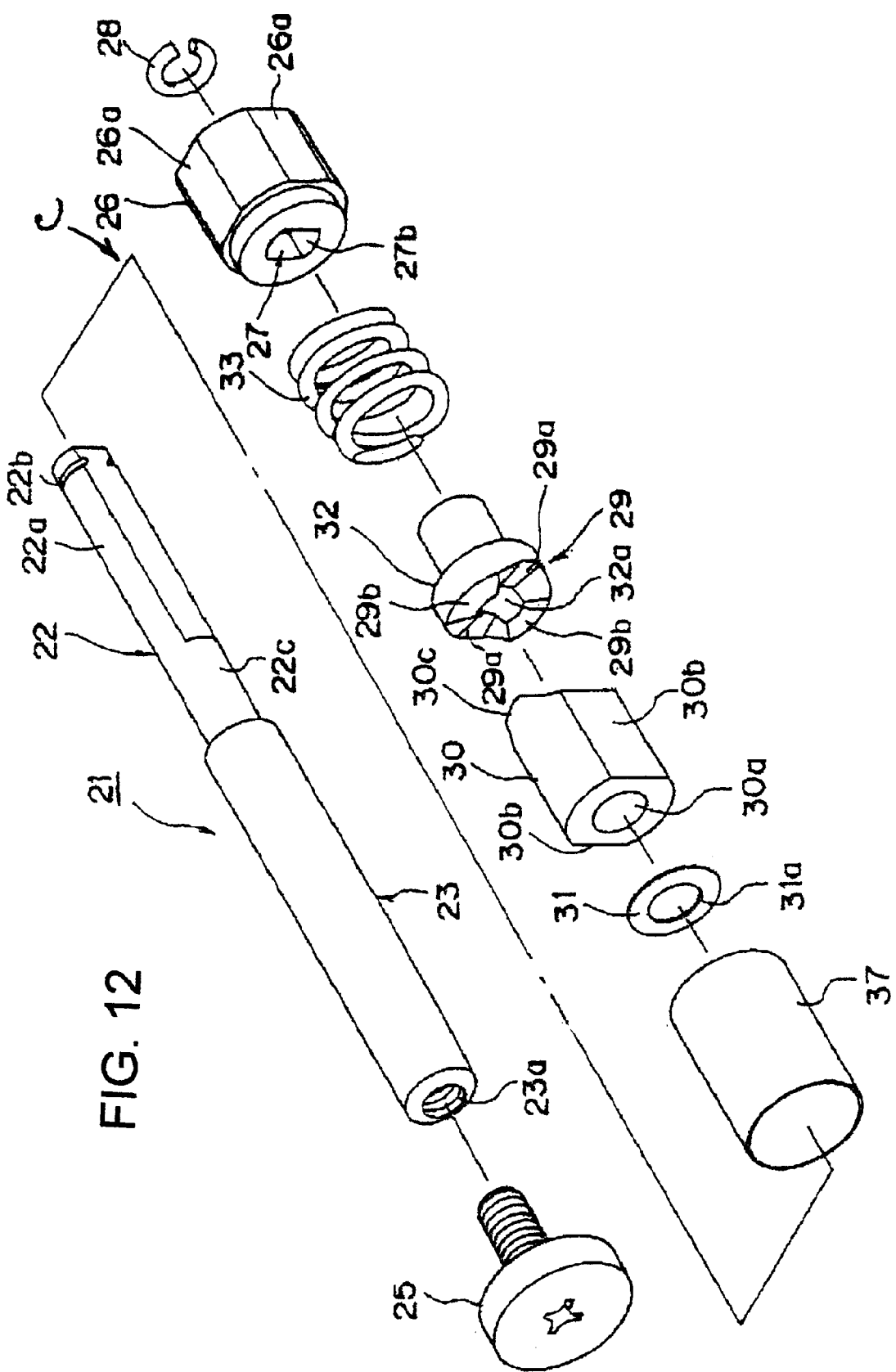
FIG. 12 is a disassembled perspective view of the hinge device shown in FIG. 10.

In FIG. 7 and FIG. 9, in a state of 0 degrees which the transmitting unit 15 is closed relative to the receiving unit 16, the projected portion 13b of the rotary sliding cam 13 is disposed at inside of the recessed portion 12a of the cam portion 12 of the fixed cam 10. The transmitting unit 15 is not spontaneously opened from the state of 0 degrees because the recessed portion 12a in which the projected portion 13b stay in a fallen state has still an allowance in depth, that is, the projected portion 13b does not completely fall into the recessed portion 12a and therefore, the transmitting unit 15 is brought into a locked state as it is by being urged to pivot in the closing direction. When the transmitting unit 15 is opened, the projected portion 13b moves from the recessed portion 12a of the cam portion 12 onto the projected portion 12b and when an opening angle of about 160 is reached, the transmitting unit 15 is automatically opened by falling again into the recessed portion 12a. At this occasion, the projected portion 13b completely falls into the recessed portion 12a and is locked. Further, the transmitting unit 15 can further be opened to exceed 160. When the telephone has finished being used and the transmitting unit 15 is to be closed relative to the receiving unit 16, the transmitting unit 15 is automatically closed to be drawn by making the projected portion 13b to fall into the recessed portion 12a and the projected portion 13b does not completely fall into the recessed portion 12a whereby the closing state is maintained as described above.

Further, with regard to control by the hinge device according to the present invention in opening and closing the transmitting unit 15, other than the above-described, by changing shapes, installation positions or the like of the cam portions or the projected portions, various variations are produced by which feeling in opening and closing operation can be changed. Thereby, the hinge device according to the present invention can be used as a hinge device for opening and closing other small-sized electronic device integrated with a display.

Further, as other embodiment, fixing means for fixing the fixing member or the fixed cam to respective attaching portions is not limited. The fixing member and the fixed cam may be fixed to respective attaching portions by engaging projections, fixing pins or other means for constituting a deformed outer peripheral portion such that the outer peripheral portion is formed in a polygonal shape or the like. Further, members for providing the projected portion 13b and the cam portion 12 may be reversed from those in the above-described embodiment. Also, shape or installation position of a projected portion or a recessed portion can variously be changed in accordance with the use.

FIGS. 10 through FIG. 16 show other embodiment of the present invention and in FIG. 10 through FIG. 13, numeral 21 designates a shaft. The shaft 21 is provided with a small diameter shaft portion 22 on one side of a central portion and a large diameter shaft portion 23 on other side portion, a deformed shaft portion 22a having a section substantially in an elliptical shape is provided at a further side portion of the small diameter shaft portion 22 and a peripheral groove 22b for fitting an engaging ring, mentioned later, is installed at an end portion of the deformed shaft portion 22a. Further, although the small diameter shaft portion 22 is provided with a circular shaft portion 22c having a section in a circular shape, a total thereof may be constituted by the deformed shaft portion. A female screw 23a is provided at an end portion of the large diameter portion 23 in the axial direction. Numeral 25 designates fixing means comprising a fixing screw screwed to the female screw 23a. Numeral 26 designates a fixing member, the fixing member 26 is provided with a stepped hole 27 comprising a circular hole 27a for attaching an engaging ring and a deformed hole 27b in an elliptical shape at a central portion thereof in the axial direction and installed with a plurality of rotational locks 26a produced by forming the outer periphery in a polygonal shape, the deformed shaft portion 22a of the shaft 21 is inserted into and locked by the deformed hole 27b and an engaging ring 28 fitted to the peripheral groove 22b is mounted to and locked by the circular hole 27a at inside of the stepped hole 27 by which the shaft 21 is locked such that the shaft 21 does not come off and the fixing member 26 rotates along with the shaft 21. A fixed cam 30 is engaged with a portion of the circular shaft portion 22c of the small diameter shaft portion 22 of the shaft 21 by rotatably inserting the circular shaft portion 12c into a circular hole 30a provided at its central portion and a friction plate 31 made of synthetic resin of nylon or the like is nterposed between the fixed cam 30 and an end face of the large diameter shaft portion 23 by inserting the circular shaft portion 22c into a circular hole 31a provided at a central portion thereof. The fixed cam 30 is provided with a plurality of rotational locks 30b produced by constituting the outer periphery in a polygonal shape and provided with a pair of projected portions 30c at a side face thereof. A rotary sliding cam 32 is attached to the shaft 21 slidably in the axial direction of the deformed shaft portion 22a and rotatably along with the shaft 21 between the fixed cam 30 and the fixing member 26 by inserting the deformed shaft portion 22a into a deformed insertion hole 32a provided at a central portion thereof in the axial direction. A cam portion 29 comprising pluralities of recessed portions 29a and projected portion 29b is installed at a side face of the rotary sliding cam 32 opposed to the projected portions 30c of the fixed cam 30. Further, a compression spring 33 is elastically provided between the rotary sliding cam 32 and the fixing member 26 by being wound around the shaft 21 and the compression spring 33 always presses the rotary sliding cam 32 to the side of the fixed cam 30 and brings the cam portion 29 into press contact with the projected portion 30c.

Further, a protection cylinder 37 is fitted to outer sides of the rotary sliding cam 32 and the compression spring 33 to prevent oil coated at inside thereof from oozing to outside thereof.

Figure 13:
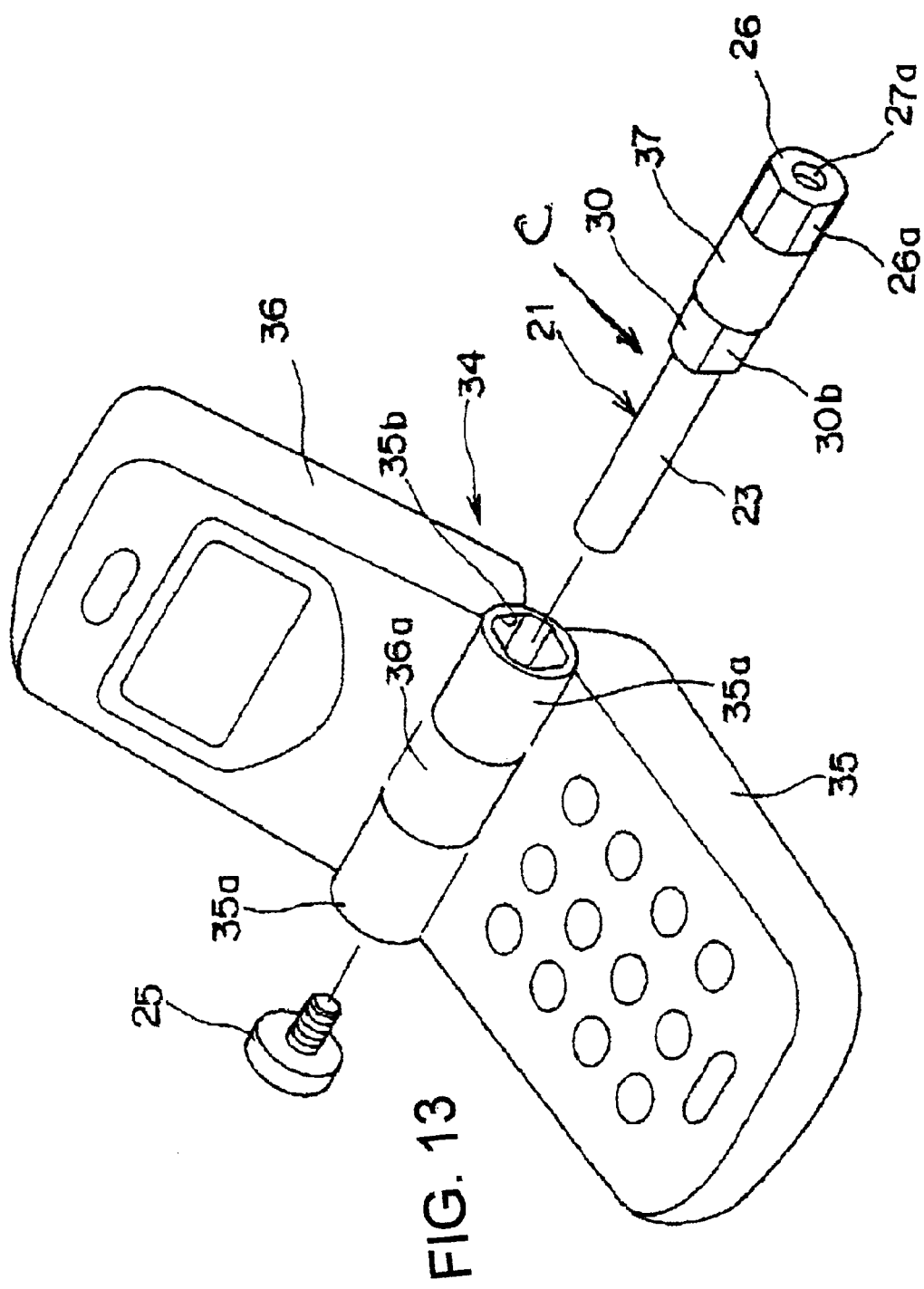
FIG. 13 is a partially disassembled perspective view of a portable telephone in which a hinge device according to the present invention is implemented.
Figure 14:
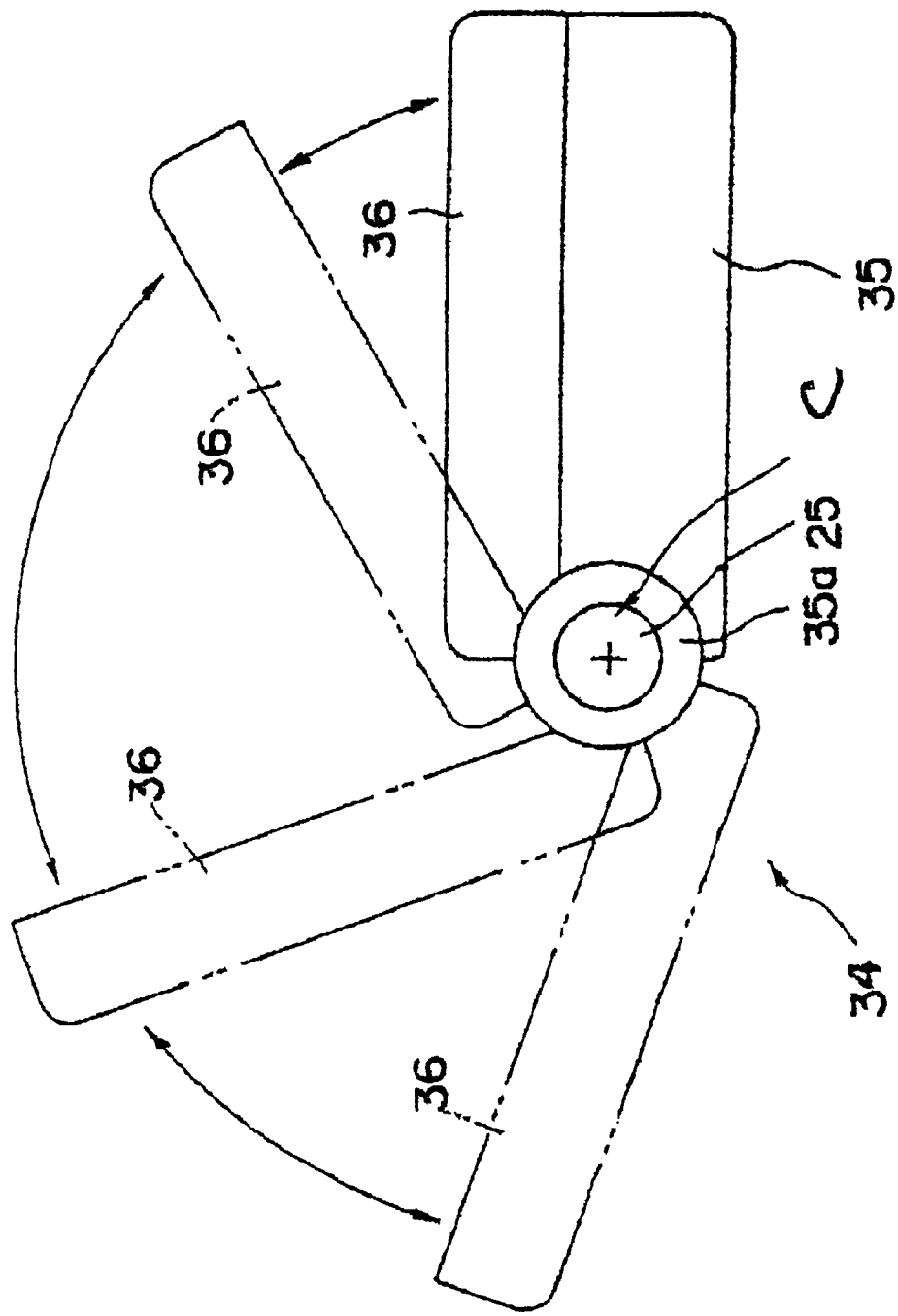
FIG. 14 is a side view of the portable telephone shown in FIG. 13.
Figure 15:
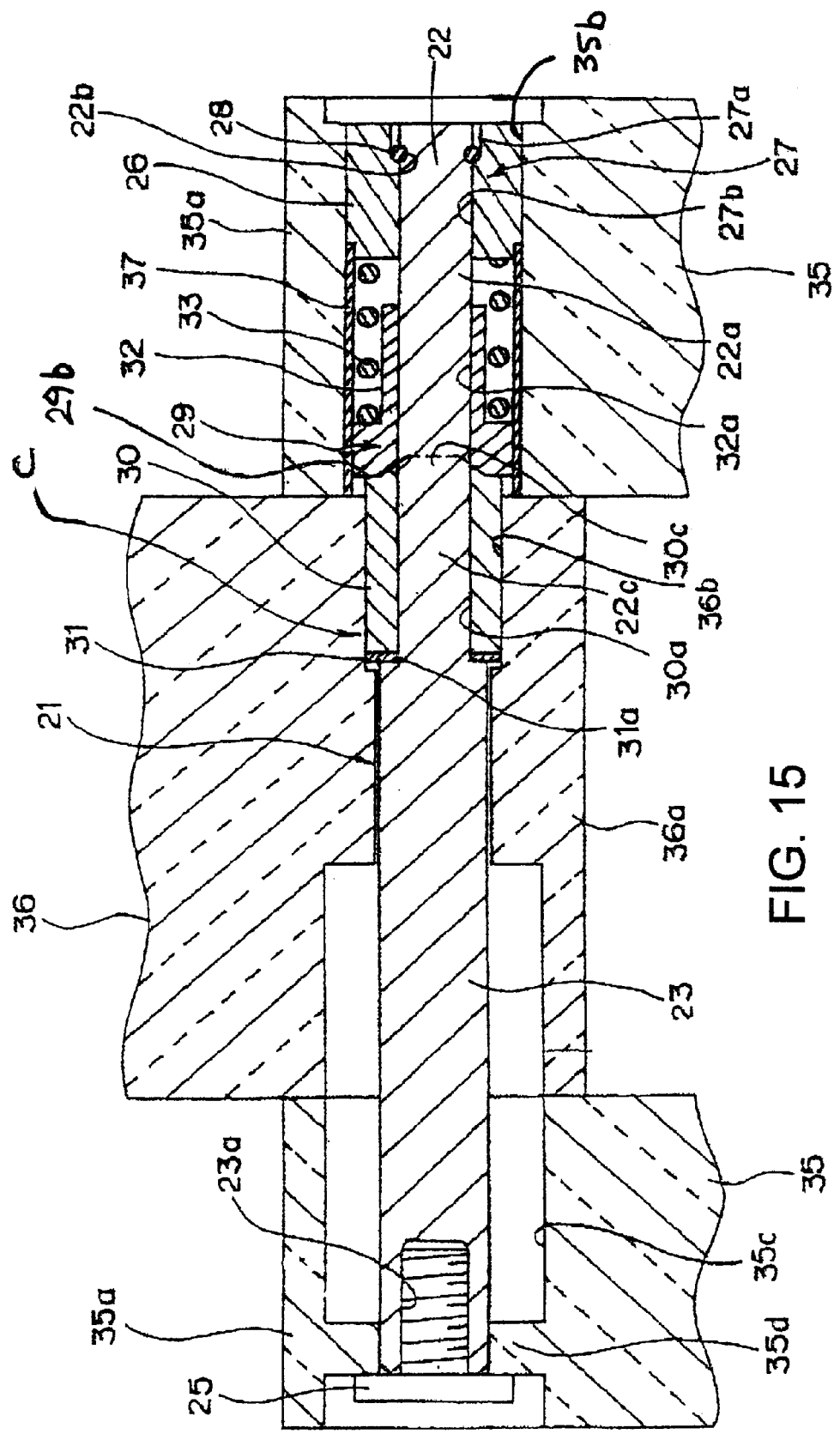
FIG. 15 is a sectional view enlarging a portion of a hinge device in the portable telephone shown in FIG. 13.

FIG. 13 through FIG. 15 show a case in which the hinge device according to the present invention is used in a portable telephone. Only a single of the hinge device A according to the present invention is used and is fixedly contained in a deformed attaching hole 35b, an attaching hole 35c and a deformed attaching hole 36b which are installed in attaching portions 35a and an attaching portion 36a provided at respective end portions of a transmitting unit 35 and a receiving unit 36 of a portable telephone 34, which is an example of an opening and closing member. For example, the hinge device A is inserted from the side of the deformed attaching hole 35b with the side of the large diameter shaft portion 23 as a front side, the respective rotational locks 30b and 26b of the fixed cam 30 and the fixing member 26 are fixedly engaged with the attaching holes 35b and 36b and the end portion of the large diameter shaft portion 23 of the shaft 21 is attached to an attaching wall 35d installed at the attaching hole 35c of other one of the attaching portion 35a by fixing it by using the fixing means 25 comprising a fixing screw. The feature of the hinge device A resides in that it is of a penetration type and a single one thereof suffices the function different from many hinge mechanisms of this kind which are provided in left and right pairs. In such a constitution, when the transmitting unit 35 is opened or closed relative to the receiving unit 36, the shaft 21 is rotated along with the attaching portions 36a of the receiving unit 36 via the fixing portion 36a. Incidentally, opening and closing of the transmitting unit 35 and the receiving unit 36 is relative and the transmitting unit 35 may be opened or closed relative to the receiving unit 36. In that case, the fixed cam 30 is rotated around the shaft 21 along with the attaching portion 36a fixedly attached with the fixed cam 30.

Figure 16:
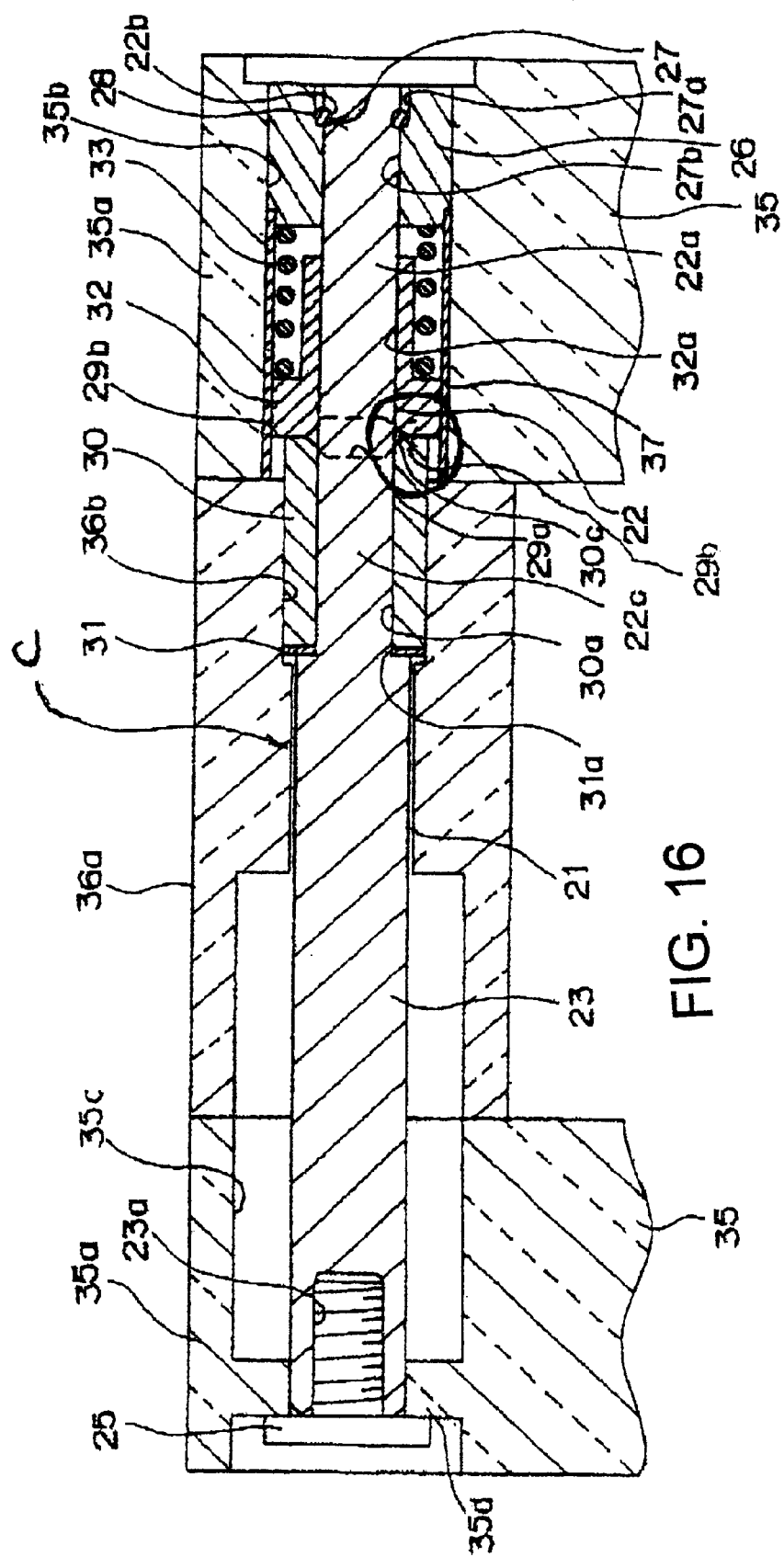
FIG. 16 is an enlarged sectional view in correspondence with the enlarged sectional view shown in FIG. 15 for explaining the operation.

In FIG. 14 and FIG. 16, now, at a state of 0 degrees which the transmitting unit 35 is closed relative to the receiving unit 36, the projected portions 30c of the fixed cam 30 are disposed at insides of the recessed portions 29a of the cam 29 of the rotary sliding cam 32. In the state of 0 degrees, the projected portions 30c are brought into a locked state by falling into the recessed portions 29a and the transmitting unit 35 is not opened spontaneously. When the transmitting unit 35 is opened, the projected portions 30c move from the recessed portions 29a onto the projected portions 29b and when an opening degree of about 160 is reached, the projected portions 30c again fall into the recessed portions 29a and the transmitting unit 35 is automatically opened. At this occasion, the projected portions 30c are locked by completely falling into the recessed portions 29a. Further, when the opening angle exceeds 160, the projected portions 30c again leave from the recessed portions 29a and move onto the projected portions 29b and further opening is made possible. When the telephone has been finished being used and the transmitting unit 35 is closed relative to the receiving unit 36, the transmitting unit 35 is automatically closed by making the projected portions 30c to be drawn into the recessed portions 29a by falling thereinto and the closed state is maintained as described above.

Further, the control by the hinge device A according to the present invention in opening and closing operation of the transmitting unit 35 can be provided with various variations by changing shapes, installation positions or the like of cam portions or projected portions other than the above-described. Thereby, the hinge device according to the present invention can be used as a hinge device for opening and closing an opening and closing member of other small-sized electronic device integrated with a display or the like.

Further, as other embodiment, the fixing means for fixing the fixing member and the fixed cam to the respective attaching portions is not limited. The fixing member and the fixed cam may be fixed to the respective attaching portions by engaging projections, fixing pins or other means. Further, members for installing the projected portions 30c and the cam portion 29 may be reversed to those in the above-described embodiment. Shapes or installation positions of the projected portions or recessed portions can be changed variously in accordance with the use. Further, the fixing means comprising the fixing screw can be replaced by an E ring, a lock ring or other publicly-known means.

While a specific embodiment of the invention has been shown and described in detail to illustrate the application of the principles of the invention, it will be understood that the invention may be embodied otherwise without departing from such principles.

What is claimed is:

1. A hinge device for opening and closing an opening and closing member which is opened or closed one-sidedly or relatively in respect of a main body of the device, said hinge device comprising:

a shaft having a flange portion at one end thereof, a deformed shaft portion at a central portion thereof, and an engaging groove for attaching an engaging ring and a peripheral groove at other end thereof;

a fixing member having a rotational lock means which is fixed to a stepping hole of one connecting portion of the opening and closing member, the fixing member having a stepping hole which is engaged with the shaft such that the fixing member is prevented from coming off from the shaft;

a fixed cam having a rotational lock means which is fixed to an attaching hole of other connecting portion of the opening and closing member, the fixed cam also having a stepping hole which is rotatably inserted with the shaft and engaged with the flange portion;

a rotary sliding cam between the fixed cam and the fixing member, engaged with the shaft inserted through a central portion thereof and rotatable along with the shaft and slidable in an axial direction;

a compression spring elastically installed between the rotary sliding cam and the fixing member by being wound around the shaft; and an E-ring fitted to a peripheral groove of the fixing member side of the shaft and engaged with a small diameter hole of one connecting portion of the opening and closing member;

the fixed cam having a pair of cam portions at opposed positions on one side face thereof and the rotary sliding cam having projected portions which are brought into pressing contact with the cam portions of the fixed cam.

2. A hinge device for opening and closing an opening and closing member which is opened and closed one-sidedly or relatively in respect of a main body of the device, said hinge device comprising:

a shaft made of a synthetic resin, the shaft having a flange portion at one end thereof, a deformed shaft portion at a central portion thereof, an engaging groove for attaching an engaging ring, and a peripheral groove at other end thereof;

a fixing member made of a synthetic resin having a rotational lock means which is fixed to a stepping hole of one connecting portion of the opening and closing member, the fixing member having a stepping hole which is engaged with the shaft such that the fixing member is prevented from coming off from the shaft;

a fixed cam having a rotational lock means a central portion of which is fixed to an attaching hole of other connecting portion of the opening and closing member, the fixed cam also having a stepping hole which is rotatably inserted with the shaft and engaged with the flange portion;

a rotary sliding cam made of a synthetic resin which is opposed to the fixed cam, engaged with the deformed shaft portion of the shaft and attached slidably in an axial direction;

a compression spring elastically installed between the rotary sliding cam and the fixing member by being wound around the shaft; and an E-ring fitted to a peripheral groove of a fixing member side of the shaft and engaged with a small diameter hole of one connecting portion of the opening and closing member;

the fixed cam having cam portions at one side face thereof and the rotary sliding cam having a plurality of projected portions which are brought into pressing contact with the cam portions.

3. A hinge device for connecting a transmitting unit and a receiving unit of a portable telephone to each other, said hinge device comprising:

a shaft having a flange portion at one end thereof, a deformed shaft portion at a central portion thereof, an engaging groove for attaching an engaging ring, and a peripheral groove at other end thereof;

a fixing member having a rotational lock means which is fixed to a stepping hole of one connecting portion of the transmitting unit and the receiving unit, the fixing member having a stepping hole which is engaged with the shaft such that the fixing member is prevented from coming off from the shaft;

a fixed cam having a rotational lock means which is rotatably inserted with the shaft at an insertion hole installed in the axial direction of a central portion thereof at said other end of the shaft, locked by the flange portion of the shaft and fixedly contained in a containing hole installed in the axial direction of a connecting portion of either of the transmitting unit and the receiving unit to which the fixing member is not fixed;

a rotary sliding cam between the fixed cam and the fixing member, engaged with the shaft inserted through a central portion thereof, and rotatable along with the shaft and slidable in the axial direction;

a compression spring elastically installed between the rotary sliding cam and the fixing member by being wound around the shaft; and an E-ring fitted to a peripheral groove of a fixing member side of the shaft and engaged with a small diameter hole of one connecting portion of either of the transmitting unit and the receiving unit;

the fixed cam having cam portions at one side face thereof and the rotary sliding cam having projected portions which are brought into pressing contact with the cam portions.

* * * * *